(12) United States Patent
Zang et al.

(10) Patent No.: US 12,043,146 B2
(45) Date of Patent: Jul. 23, 2024

(54) SEAT TRACK ASSEMBLY WITH MEMORY MECHANISM

(71) Applicants: Magna Seating Inc., Aurora (CA); Creston A Zang, Northville, MI (US); Kristof M Kurzeja, Commerce Township, MI (US)

(72) Inventors: Creston A Zang, Northville, MI (US); Kristof M Kurzeja, Commerce Township, MI (US)

(73) Assignee: Magna Seating Inc., Aurora (CA)

( * ) Notice: Subject to any disclaimer, the term of this patent is extended or adjusted under 35 U.S.C. 154(b) by 255 days.

(21) Appl. No.: 17/627,790

(22) PCT Filed: Jul. 15, 2020

(86) PCT No.: PCT/US2020/070276
§ 371 (c)(1),
(2) Date: Jan. 17, 2022

(87) PCT Pub. No.: WO2021/011963
PCT Pub. Date: Jan. 21, 2021

(65) Prior Publication Data
US 2022/0324357 A1   Oct. 13, 2022

Related U.S. Application Data

(60) Provisional application No. 62/874,716, filed on Jul. 16, 2019.

(51) Int. Cl.
*B60N 2/12*   (2006.01)
*B60N 2/07*   (2006.01)
*B60N 2/08*   (2006.01)

(52) U.S. Cl.
CPC .......... *B60N 2/123* (2013.01); *B60N 2/0715* (2013.01); *B60N 2/0812* (2013.01); *B60N 2/0875* (2013.01); *B60N 2002/126* (2013.01)

(58) Field of Classification Search
CPC .... B60N 2/123; B60N 2/0727; B60N 2/0715; B60N 2/0825; B60N 2/0875
See application file for complete search history.

(56) References Cited

U.S. PATENT DOCUMENTS 6,102,478 A * 8/2000 Christopher ........... B60N 2/123
297/341
9,050,909 B2   6/2015 Rohnert et al.
(Continued)

FOREIGN PATENT DOCUMENTS

DE   102007028242   7/2012
DE   102018205854   11/2018
(Continued)

*Primary Examiner* — Timothy J Brindley
(74) *Attorney, Agent, or Firm* — Miller Canfield (57) ABSTRACT

A seat track assembly provides forward and rearward movement of a seat assembly. A latch mechanism allows movement of a movable track between a plurality of positions. A memory mechanism with a memory plate and a memory tab are operable between a home position in which the memory tab is disposed in a recess of the moveable track, and a memory position in which the memory plate is coupled with a plurality of angled teeth to define a selected position. Actuation of the memory mechanism to the memory position unlocks the latch mechanism to allow movement of the movable track in a first direction away from the selected position to an easy-entry position. Movement of the movable track in a second direction from the easy-entry position stops the movable track at the selected position, allowing the latch mechanism to lock and the memory mechanism to return to the home position.

29 Claims, 11 Drawing Sheets

(56) References Cited

U.S. PATENT DOCUMENTS

| | | |
|---|---|---|
| 9,308,834 B2 | 4/2016 | Tame et al. |
| 9,919,622 B2 | 3/2018 | Tame et al. |
| 2010/0026070 A1 | 2/2010 | Rohee et al. |
| 2011/0012004 A1* | 1/2011 | Wieclawski ......... B60N 2/0705 |
| | | 248/429 |
| 2013/0278033 A1 | 10/2013 | Tame et al. |
| 2021/0155126 A1* | 5/2021 | Ploch ................... B60N 2/3011 |

FOREIGN PATENT DOCUMENTS

| | | |
|---|---|---|
| FR | 2882539 | 9/2006 |
| FR | 2902714 | 12/2007 |
| GB | 1026232 | 4/1966 |

* cited by examiner

SEAT TRACK ASSEMBLY WITH MEMORY MECHANISM

CROSS-REFERENCE TO RELATED APPLICATIONS

This application claims priority to and all the benefits of U.S. Provisional Application 62/874,716, filed on Jul. 16, 2019, which is hereby incorporated by reference in its entirety.

BACKGROUND OF THE INVENTION

1. Field of the Invention

The present invention relates to a seat track assembly for providing forward and rearward movement of a seat assembly along a floor of an automotive vehicle.

2. Description of Related Art

Seat track assemblies for providing forward and rearward movement of a seat assembly along a floor of an automotive vehicle are known in the art. Typical seat track assemblies include a fixed track adapted to be fixedly secured to the floor of the automotive vehicle and a movable track adapted to be fixedly secured to the seat assembly and slidably coupled to the fixed track. Often a latch mechanism is operatively coupled between the fixed and movable tracks, wherein the latch mechanism prevents sliding movement of the movable track and is selectively disengaged from the fixed track to allow sliding movement of the movable track between a plurality of positions. A memory mechanism is operatively coupled to the moveable track and operable between a home position in which a memory plate is disengaged from the fixed track for moving with the moveable track during sliding movement thereof, and a memory position in which the memory plate is engaged with the fixed track to define a previously selected one of the plurality of positions. Additionally, actuation of the memory mechanism to the memory position often disengages the latch mechanism from the fixed track, thereby allowing sliding movement of the movable track in a first direction from the previously selected one of the plurality of positions to an easy-entry position, and in a second direction opposite the first direction from the easy-entry position wherein the memory mechanism stops the movable track at the previously selected one of the plurality of positions, thereby reengaging the latch mechanism with the fixed track and returning the memory mechanism to the home position. However, the seat track assemblies known in the art can be difficult to operate efficiently due to increased friction between the memory mechanism and the moveable track as the memory mechanism moves between the home and memory positions. Additionally, seat track assemblies known in the art can have difficulty efficiently returning to the previously selected one of the plurality of positions after moving from the easy-entry position due to potentially imprecise engagement between the memory mechanism and the fixed track.

SUMMARY OF THE INVENTION

According to one aspect of the invention, a seat track assembly is provided for forward and rearward movement of a seat assembly along a floor of an automotive vehicle. The seat track assembly includes a fixed track adapted to be fixedly secured to the floor of the automotive vehicle and a tooth rack extending along and fixedly secured to the fixed track, the tooth rack having a plurality of teeth extending upwardly therefrom. The seat track assembly further includes a movable track adapted to be fixedly secured to the seat assembly and slidably coupled to the fixed track. A latch mechanism is operatively coupled between the fixed and movable tracks to prevent sliding movement of the movable track and is selectively disengaged from the fixed track to allow sliding movement of the movable track between a plurality of positions. A memory mechanism is operatively coupled to the moveable track and operable between a home position in which the memory mechanism is disengaged from the plurality of teeth for moving with the moveable track during sliding movement thereof, and a memory position in which the memory mechanism is engaged with the plurality of teeth for coupling to the fixed track to define a previously selected one of the plurality of positions. Actuation of the memory mechanism to the memory position disengages the latch mechanism from the fixed track, thereby allowing sliding movement of the movable track in a first direction from the previously selected one of the plurality of positions to an easy-entry position, and in a second direction opposite the first direction from the easy-entry position wherein the memory mechanism stops the movable track at the previously selected one of the plurality of positions, thereby reengaging the latch mechanism with the fixed track and returning the memory mechanism to the home position. Additionally, the plurality of teeth are angled relative to the floor of the automotive vehicle for increasing engagement with the memory mechanism when in the memory position to further secure the memory mechanism to the fixed track at the previously selected one of the plurality of positions.

According to another aspect of the invention, a seat track assembly is provided for forward and rearward movement of a seat assembly along a floor of an automotive vehicle. The seat track assembly includes a fixed track adapted to be fixedly secured to the floor of the automotive vehicle and a movable track adapted to be fixedly secured to the seat assembly and slidably coupled to the fixed track. The moveable track further includes an elongated slot extending between opposite first and second ends with a recess extending from the first end thereof. A latch mechanism is operatively coupled between the fixed and movable tracks to prevent sliding movement of the movable track and is selectively disengaged from the fixed track to allow sliding movement of the movable track between a plurality of positions. A memory mechanism includes a memory plate operatively coupled to the moveable track and a memory tab extending laterally from the memory plate through the elongated slot. The memory mechanism is operable between a home position in which the memory plate is disengaged from the fixed track and the memory tab is secured in the recess of the elongated slot for moving with the moveable track during sliding movement thereof, and a memory position in which the memory plate is engaged with the fixed track and the memory tab is withdrawn from the recess of the elongated slot to define a previously selected one of the plurality of positions. Actuation of the memory mechanism to the memory position disengages the latch mechanism from the fixed track, thereby allowing sliding movement of the movable track in a first direction from the previously selected one of the plurality of positions to an easy-entry position, and in a second direction opposite the first direction from the easy-entry position wherein the memory tab reengages the recess to stop the movable track at the previously selected one of the plurality of positions, thereby reengaging the latch mechanism with the fixed track and returning the memory mechanism to the home position. Additionally, the recess is defined by a front wall extending from the first end of the elongated slot, an opposite rear wall, a floor extending between the rear and front walls, and a truncated corner connecting the rear wall of the recess to the elongated slot. The memory tab extends along the elongated slot between a head portion and an arm portion such that the head portion is adapted to selectively and matingly couple within the front and rear walls of the recess and the arm portion is adapted to selectively engage the truncated corner for reducing friction between the recess and the memory tab as the memory mechanism moves to and from the home position.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
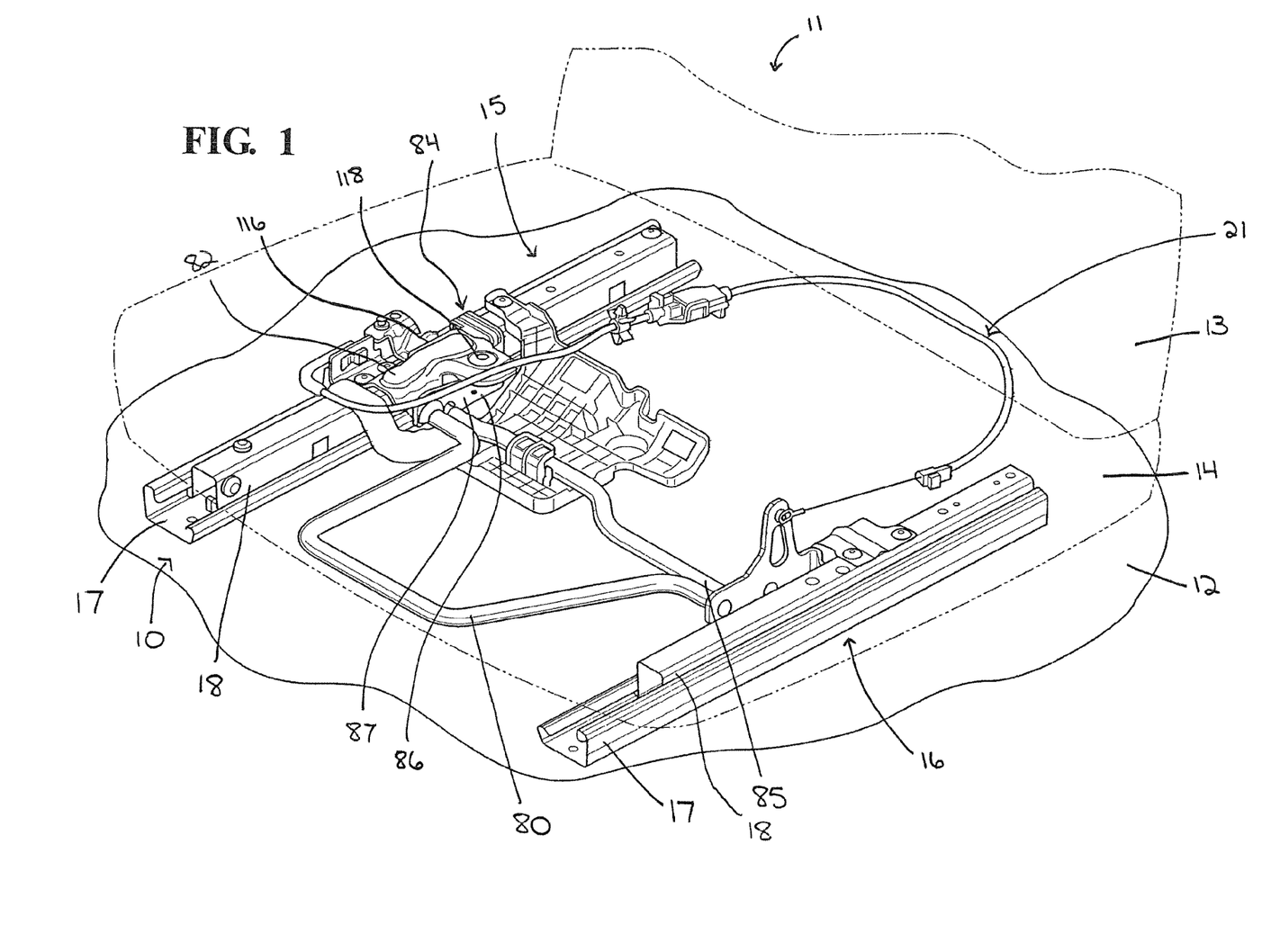
FIG. 1 is a perspective view of a seat assembly with a seat track assembly according to a primary embodiment of the present invention.

Referring to the Figures, wherein like numerals indicate like or corresponding parts throughout the several views, a seat track assembly 10 operatively interconnects a seat assembly 11 to a floor 12 of an automotive vehicle. Referring to FIG. 1, the seat assembly 11 includes a seat back 13 operatively coupled to a seat cushion 14 for allowing selective pivotal movement of the seat back 13 relative to the seat cushion 14 between a plurality of reclined seating positions. The seat back 13 is also pivotally movable to a forwardly folded position for increased ingress and egress room behind the seat assembly 11. The seat track assembly 10 includes a primary seat track assembly 15 laterally spaced apart from a secondary seat track assembly 16. The primary and secondary seat track assemblies 15, 16 are operatively connected via a cross-talk cable 21 to allow selective longitudinal sliding adjustment of the seat assembly 11 between a plurality of fore/aft seating positions along the floor 12 of the automotive vehicle, including an easy-entry position corresponding with a forwardmost position of the plurality of fore/aft seating positions. When the seat back 13 is pivoted to the forwardly folded position, the seat assembly 11 automatically slides forward from a previously selected fore/aft seating position to the easy-entry position. Although only the primary seat track assembly 15 is described in detail herein, it is to be appreciated that the primary and secondary seat track assemblies 15, 16 are substantially similar and correspondingly move along the floor 12 of the automotive vehicle.

The primary seat track assembly 15 includes a fixed track 17 operatively coupled with a movable track 18, as shown in FIG. 1. The fixed track 17 is adapted to be fixedly secured to the floor 12 of the automotive vehicle by a pair of risers. The movable track 18 is adapted to be fixedly secured to an underside of the seat cushion 14 and is slidably coupled to the fixed track 17 for longitudinal sliding movement relative thereto. Thus, when the movable track 18 slides along the fixed track 17, the seat assembly 11 moves correspondingly with the moveable track 18 for adjustment between the plurality of fore/aft seating positions.

Figure 2:
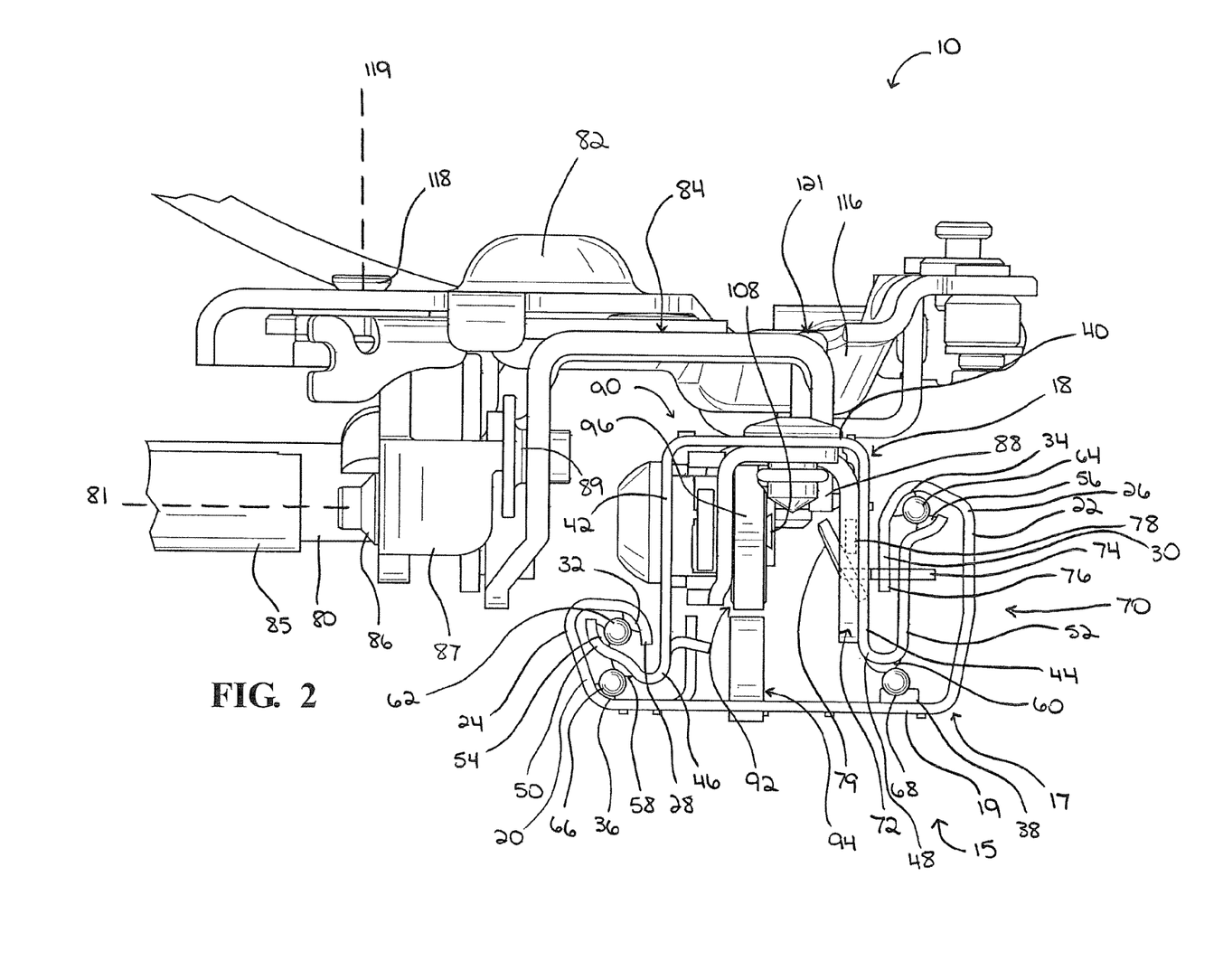
FIG. 2 is a fragmentary rear view of the seat track assembly of FIG. 1.

Referring to FIG. 2, the fixed track 17 has a generally U-shaped cross-section that is defined by a horizontal lower portion 19 extending laterally between upwardly-extending outer side walls 20, 22. The outer side walls 20, 22 each include an end portion 24, 26 extending laterally inward therefrom and terminating at a downward extending flange 28, 30. Each of the end portions 24, 26 define a downward-facing bearing surface 32, 34 extending longitudinally along the fixed track 17. In addition, the lower portion 19 defines an upward-facing bearing surface 36, 38 generally adjacent to each of the outer side walls 20, 22 and extending longitudinally along the fixed track 17. However, it is to be appreciated that the fixed track 17 and the bearing surfaces 32, 34, 36, 38 may take any suitable shape or arrangement without varying the scope of the invention.

The movable track 18 has a generally U-shaped cross-section that is inverted relative to the fixed track 17 and is defined by a horizontal upper portion 40 spaced apart from the lower portion 19 of the fixed track 17 and extending laterally between downwardly-extending inner side walls 42, 44, as shown in FIG. 2. The inner side walls 42, 44 each include an end portion 46, 48 extending laterally outward therefrom and terminating at an upwardly extending flange 50, 52. The inner side walls 42, 44 of the movable track 18 interlock with the outer side walls 20, 22 of the fixed track 17. More specifically, the upwardly extending flanges 50, 52 of the inner side walls 42, 44 are nested within the end portions 24, 26 of the fixed track 17 for engagement of the movable track 18 with the fixed track 17 to help prevent separation thereof if the seat assembly 11 is subjected to large forces. Each of the upwardly extending flanges 50, 52 define an upward-facing bearing surface 54, 56 extending longitudinally along the movable track 18. In addition, each of the end portions 46, 48 define a downward-facing bearing surface 58, 60 extending longitudinally along the movable track 18. However, it is to be appreciated that the moveable track 18 and the bearing surfaces 54, 56, 58, 60 may take any suitable shape or arrangement without varying the scope of the invention.

Referring to FIG. 2, the upward-facing bearing surfaces 54, 56 of the movable track 18 are in opposing relation to the downward-facing bearing surfaces 32, 34 of the fixed track 17. A plurality of roller bearings 62, 64 are disposed therebetween to provide smooth forward and rearward sliding movement of the movable track 18 relative to the fixed track 17. Similarly, the downward-facing bearing surface 58 of the movable track 18 is in opposing relation to the upward-facing bearing surface 36 of the fixed track 17. A plurality of roller bearings 66 are disposed therebetween to provide smooth forward and rearward sliding movement of the movable track 18 relative to the fixed track 17. Further, the downward-facing bearing surface 60 of the movable track 18 is in opposing relation to the upward-facing bearing surface 38 of the fixed track 17, and a roller mechanism 68 is disposed therebetween to provide smooth forward and rearward sliding movement of the movable track 18 relative to the fixed track 17.

The primary seat track assembly 15 includes a latch mechanism 70 for selectively locking the seat assembly 11 in any one of the plurality of fore/aft seating positions, as shown in FIG. 2. More specifically, the latch mechanism 70 is operatively coupled to the movable track 18 for selectively locking the movable track 18 with the fixed track 17 to prevent forward and rearward sliding movement of the movable track 18 relative to the fixed track 17. The latch mechanism 70 is disposed generally within a space defined between the lower portion 19 of the fixed track 17 and the upper portion 40 of the movable track 18. The latch mechanism 70 includes a latch body 72 that is operatively coupled to an inner surface of the inner side wall 44 of the movable track 18 and is operable between a locked position, as shown in FIG. 2, and an unlocked position. A loop latch 74 extends laterally through the inner side wall 44 and the upwardly extending flange 52 of the movable track 18 and is adapted for engaging a plurality of downward-facing latching teeth 76 spaced longitudinally along the downward extending flange 30 of the fixed track 17. A leaf spring 78 extends longitudinally through the latch body 72 and is coupled to the inner surface of the inner side wall 44 of the movable track 18 at opposite ends by tabs 79 extending from the movable track 18. The leaf spring 78 biases the latch body 72 upward towards the locked position, wherein the loop latch 74 engages the latching teeth 76 on the fixed track 17, thereby locking the movable track 18 with the fixed track 17, as shown in FIG. 2.

Figure 3:
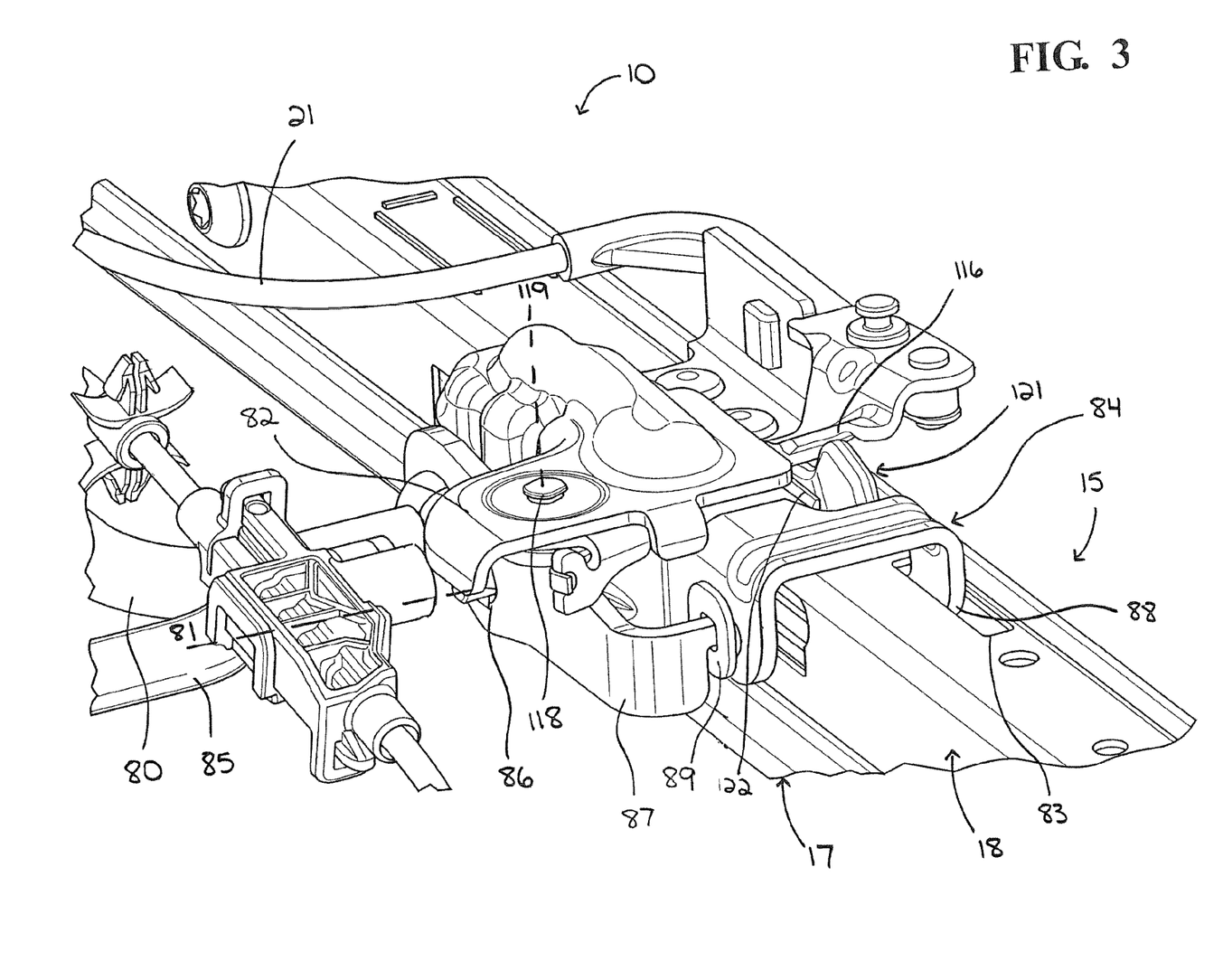
FIG. 3 is a fragmentary perspective view of the seat track assembly of FIG. 1.
Figure 4:
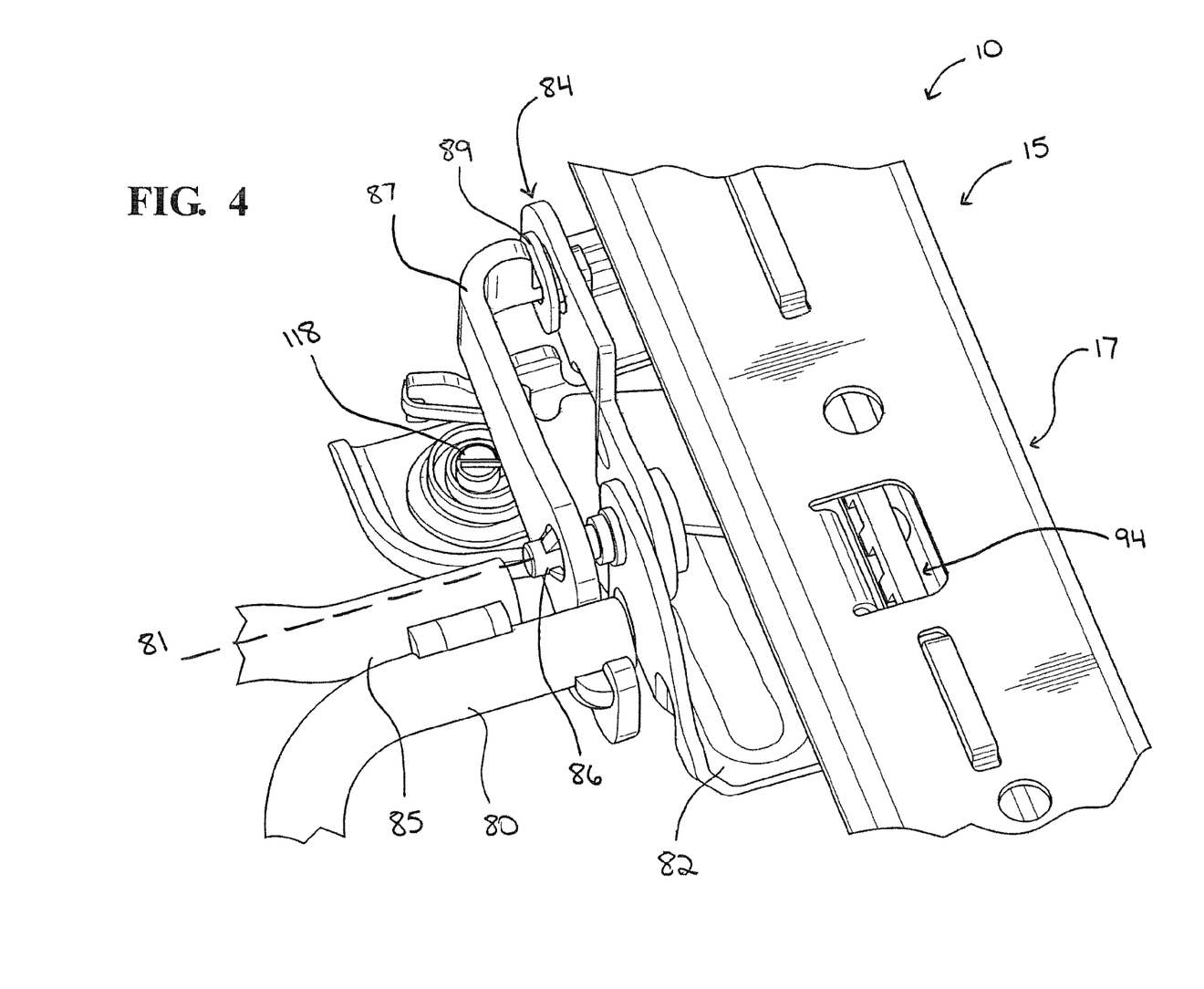
FIG. 4 is a fragmentary perspective view from underneath the seat track assembly of FIG. 1.

Referring to FIG. 2, the latch body 72 is moved downward, against the bias of the leaf spring 78, to disengage the loop latch 74 from the latching teeth 76 in response to actuating a towel bar 80. More specifically, referring to FIGS. 2, 3, and 4, a mounting bracket 82 is fixedly secured to an upper surface of the upper portion 40 of the movable track 18 and a latch release lever 84 is pivotally coupled to the mounting bracket 82 at a pivot 86, which defines a first laterally extending axis 81. The latch release lever 84 includes an arm 88 that extends through an opening 83 in the upper portion 40 of the movable track 18 and is adapted for engaging the latch body 72, as shown in FIGS. 2 and 3. The towel bar 80 includes a cross bar 85 and extension bracket 87. The extension bracket 87 of towel bar 80 is pivotally coupled to mounting bracket 82 at pivot 86 and operatively coupled to latch release lever 84 at an interface 89. It is to be appreciated that the interface 89 may have any suitable structure or take any suitable configuration or arrangement without varying the scope of the invention. For example, the interface 89 may alternatively include a pin and slot configuration, a rivet, or a weld. The towel bar 80 is accessible to a seat occupant and is typically located underneath the seat cushion 14. When the towel bar 80 is lifted, the extension bracket 87 and latch release lever 84 rotate about pivot 86 and the arm 88 of latch release lever 84 pushes the latch body 72 downward towards the unlocked position, wherein the loop latch 74 is disengaged from the latching teeth 76 of the fixed track 17, thereby unlocking the movable track 18 from the fixed track 17.

Figure 5:
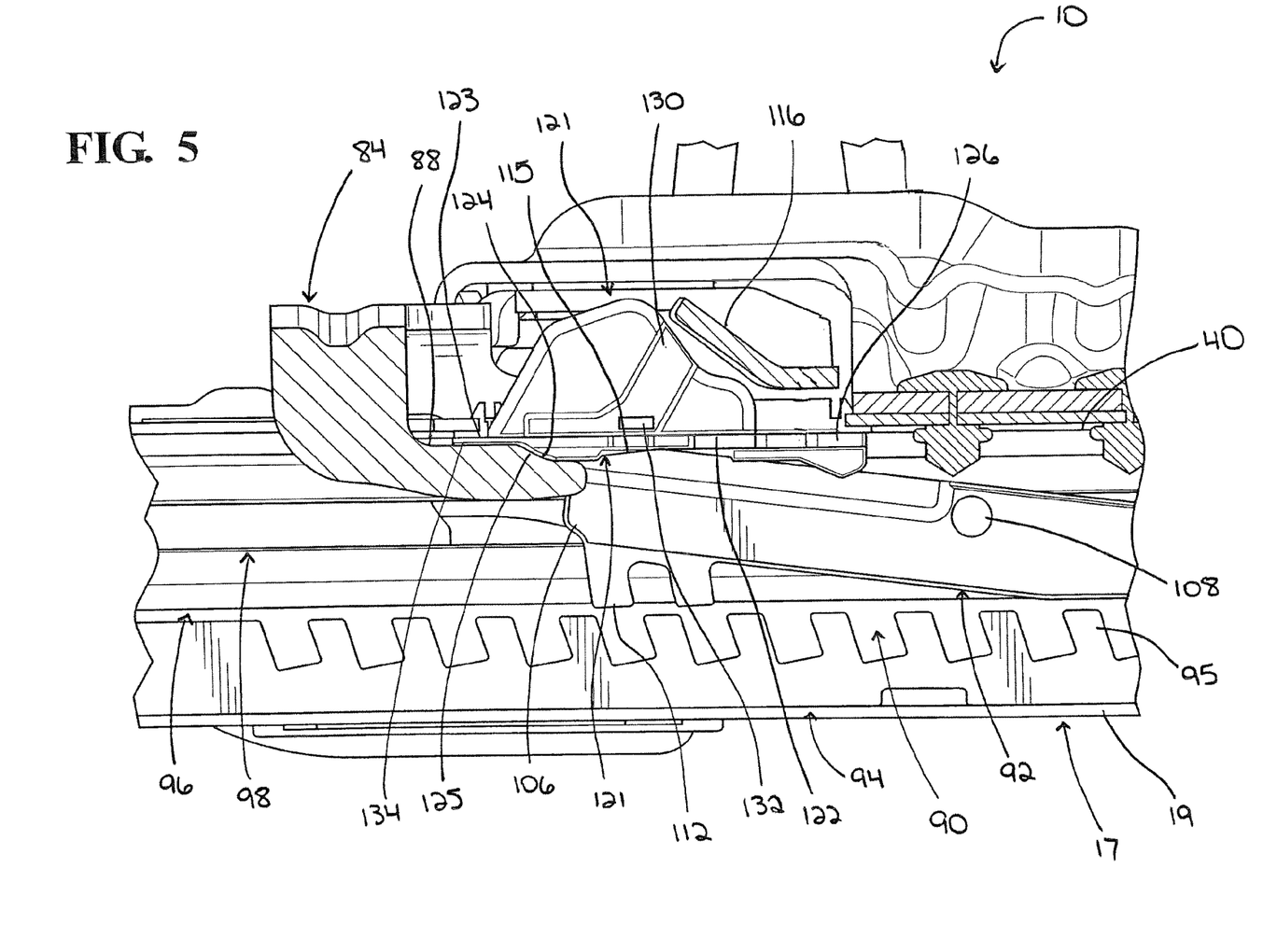
FIG. 5 is a fragmentary cross-sectional side view of the seat track assembly of FIG. 1 showing a memory plate of a memory mechanism in a home position.
Figure 6:
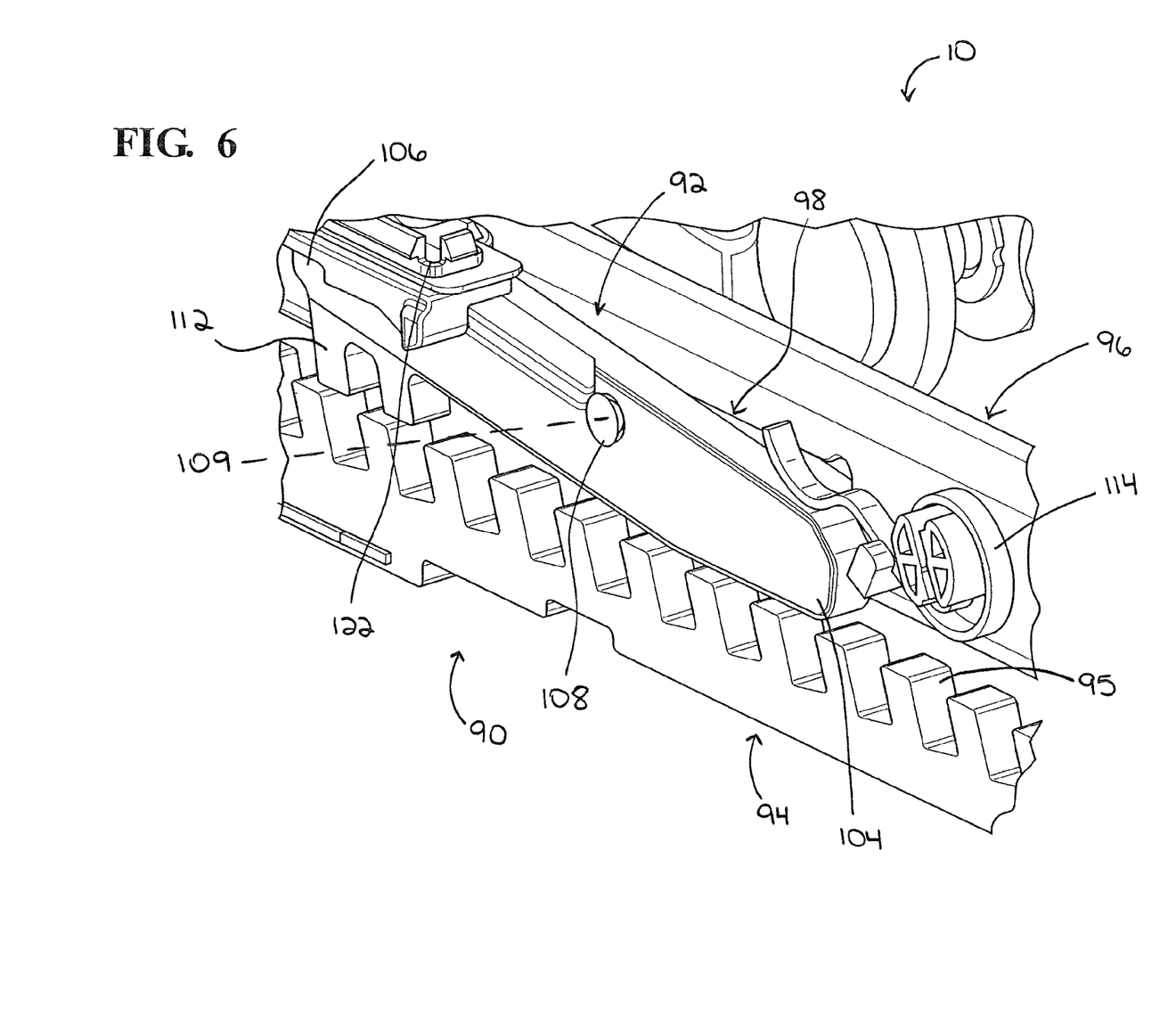
FIG. 6 is a fragmentary perspective view the seat track assembly of FIG. 1 further showing the memory plate of the memory mechanism in the home position.
Figure 7:
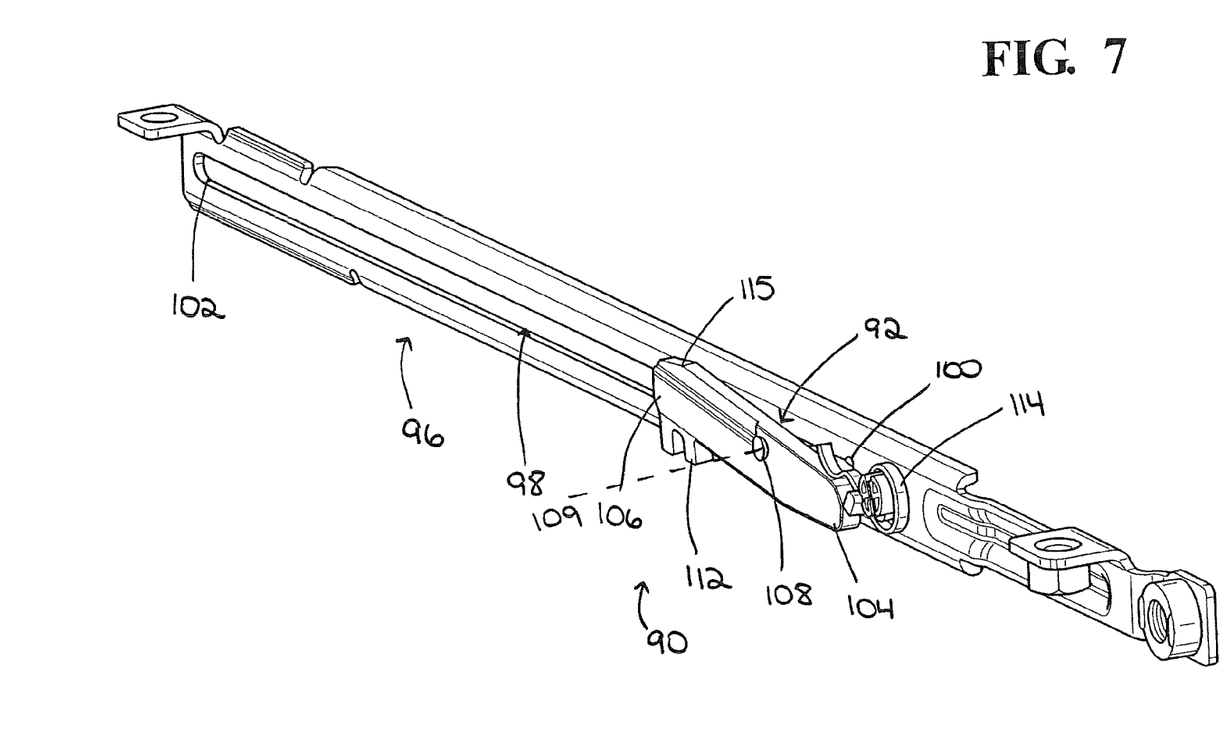
FIG. 7 is a perspective view of the seat track assembly of FIG. 1 showing a guide bracket and the memory plate.

Referring to FIGS. 2, 5, and 6-7, the primary seat track assembly 15 also includes a memory mechanism 90 which allows the seat assembly 11 to return to the previously selected fore/aft seating position after the seat assembly 11 is moved to the easy-entry position. The memory mechanism 90 includes a memory plate 92 that selectively engages a tooth rack 94 to identify the previously selected fore/aft seating position. The tooth rack 94 extends longitudinally along and is fixedly secured to the lower portion 19 of the fixed track 17 and has a plurality of angled teeth 95 extending upwardly therefrom. The angled teeth 95 of the tooth rack 94 are tilted rearward relative to the lower portion 19 of the fixed track 17 for increasing mating engagement of the angled teeth 95 with the memory plate 92 to accurately identify the previously selected fore/aft seating position. A guide bracket 96, as shown in FIG. 7, extends longitudinally and is fixedly secured to an inner surface of the inner side wall 42 of the movable track 18. The guide bracket 96 includes a guide slot 98 extending longitudinally between a forward end 100 and a rearward end 102.

Figure 8:
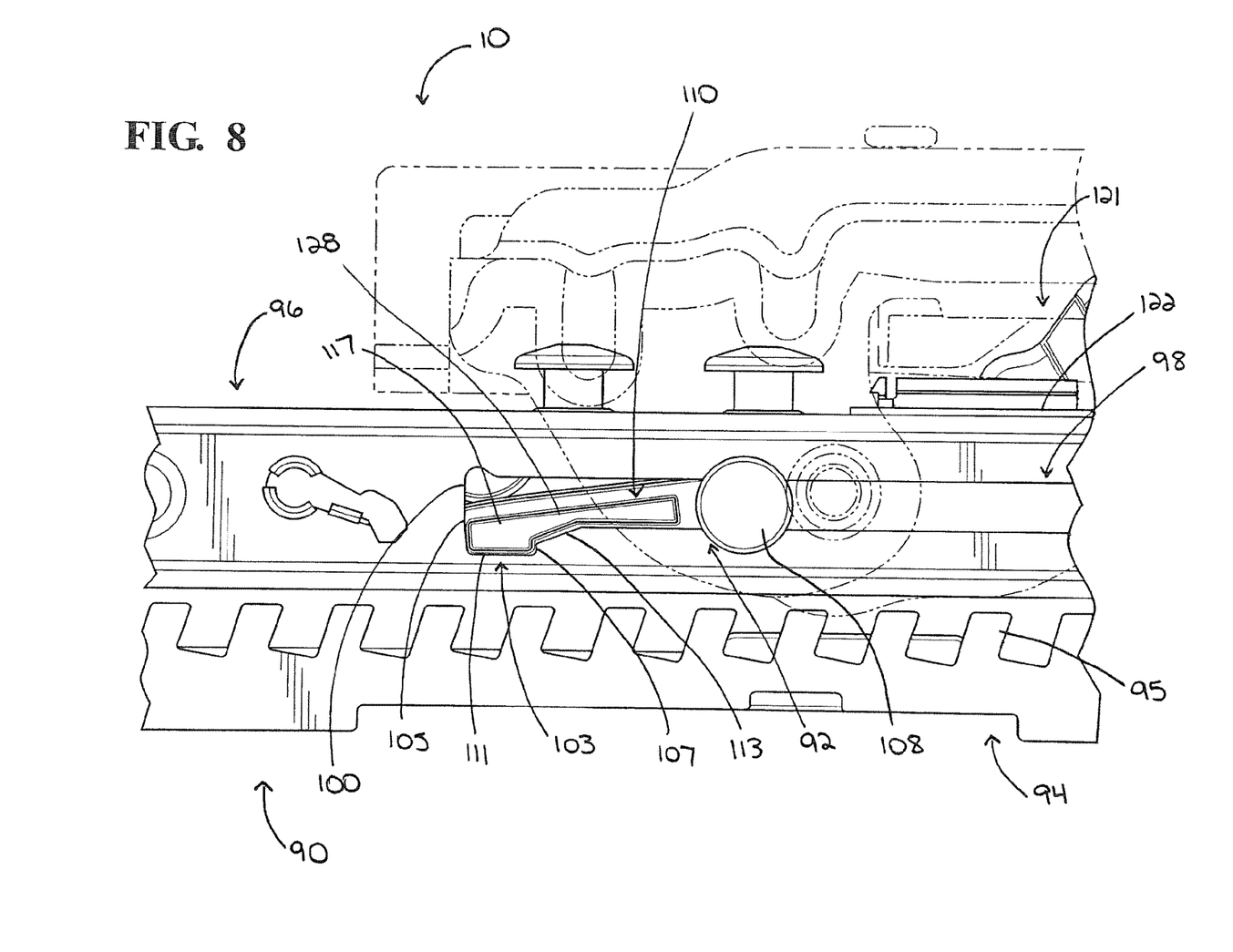
FIG. 8 is a fragmentary side view of the seat track assembly of FIG. 1 further showing the memory plate of the memory mechanism in the home position.

Referring to FIG. 8, a recess 103 extends downwardly from the forward end 100 of the guide slot 98. The recess 103 is defined by a front wall 105 extending downwardly from the forward end 100 of the guide slot 98, an opposite rear wall 107, and a floor 111 extending therebetween. Additionally, the recess 103 includes a truncated corner 113 connecting the rear wall 107 to the guide slot 98. The memory plate 92 is disposed laterally between the guide bracket 96 and the latch body 72, as shown in FIG. 2. Referring to FIGS. 6 and 7, the memory plate 92 extends longitudinally between a front end 104 and a rear end 106 and is pivotally and slidably coupled to the guide slot 98 by a pin 108 located substantially equidistant between the front and rear ends 104, 106 thereof. The pin 108 defines a second laterally extending axis 109. Referring to FIG. 8, a memory tab 110 extends laterally from the front end 104 of the memory plate 92 and is disposed in the guide slot 98. The memory tab 110 extends along the guide slot between a head portion 117 and an arm portion 128. The head portion 117 of the memory tab 110 is adapted to selectively and matingly couple within the front and rear walls 105, 107 of the recess 103, and the arm portion 128 of the memory tab 110 extends partially along the guide slot 98 from the head portion 117 and is adapted to selectively engage the truncated corner 113 of the recess 103. A pair of memory teeth 112 extend downward from the rear end 106 of the memory plate 92, as shown in FIGS. 5-7 and 9, and are adapted for selective mating engagement with the angled teeth 95 of the tooth rack 94. An engagement surface 115 is disposed at the rear end 106 of the memory plate 92, as is described in further detail in the paragraphs below.

Figure 9:
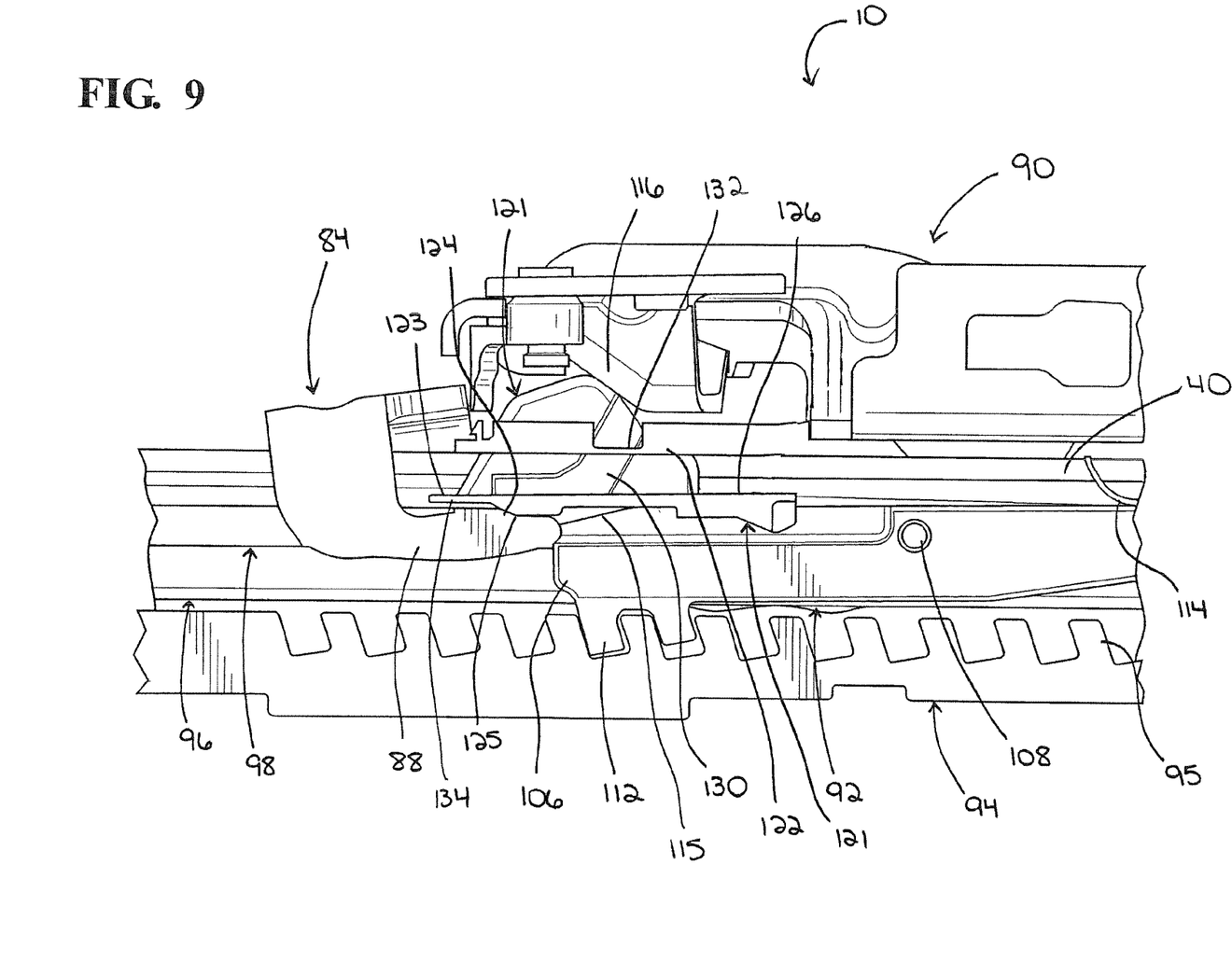
FIG. 9 is a fragmentary side view of the seat track assembly of FIG. 1 showing the memory plate of the memory mechanism in a memory position.
Figure 10:
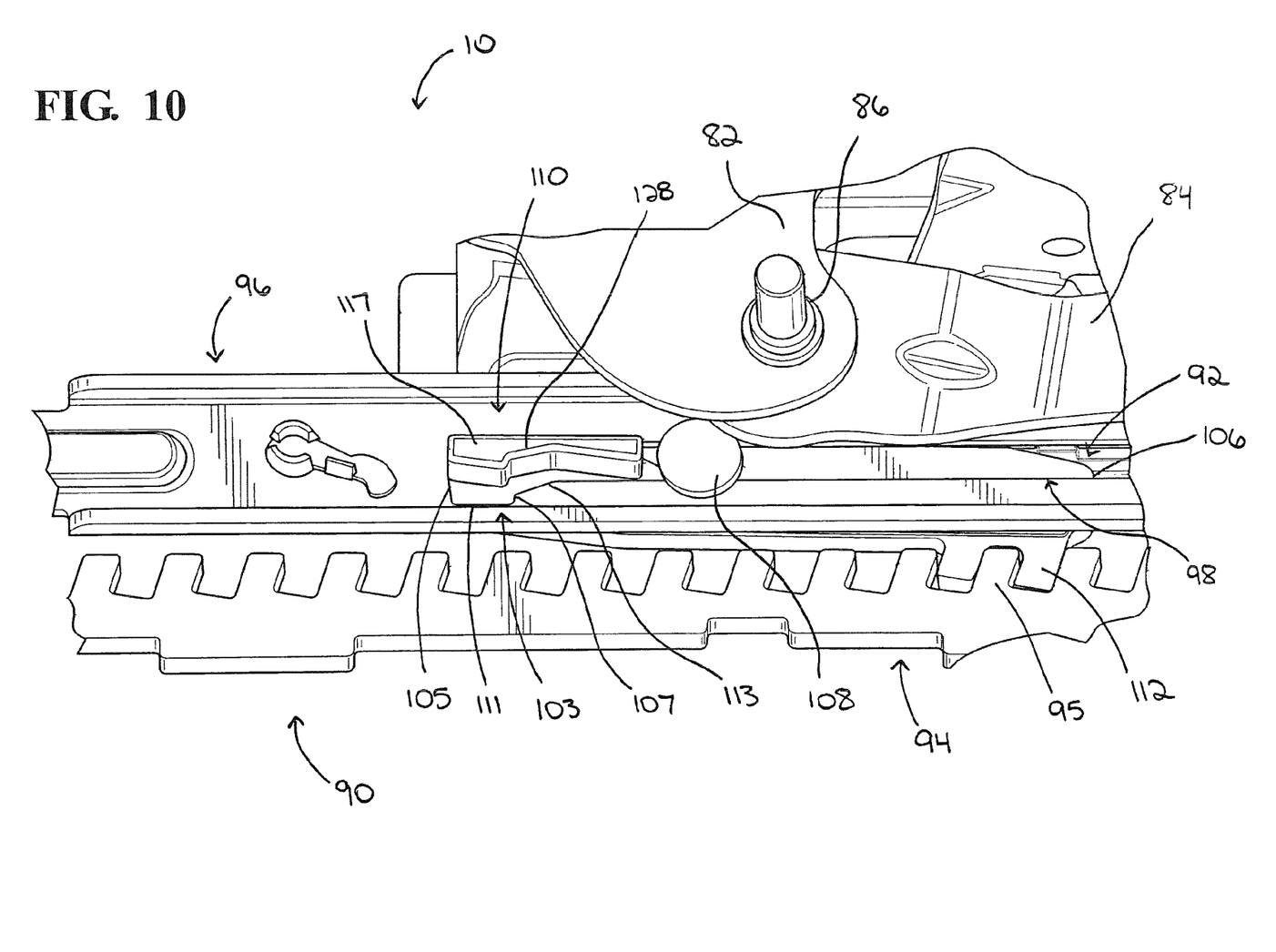
FIG. 10 is a fragmentary perspective view of the seat track assembly of FIG. 1 further showing the memory plate of the memory mechanism in the memory position.

The memory plate 92 rotates about the pin 108 between a home position, as shown in FIGS. 5, 6, and 8, and a memory position, as shown in FIGS. 9 and 10. The memory plate 92 is biased to the home position by a coil spring 114 mounted to the guide bracket 96 adjacent the forward end 100 of the guide slot 98, as shown in FIGS. 6 and 7. The coil spring 114 is adapted to engage the front end 104 of the memory plate 92 to bias the memory tab 110 downward into the recess 103 on the guide bracket 96. In the home position, the memory tab 110 is disposed in the recess 103 on the guide bracket 96 and the memory teeth 112 are disengaged from the angled teeth 95 of the tooth rack 94. In other words, when in the home position, the memory plate 92 is coupled with the guide bracket 96 and therefore travels with the movable track 18 during sliding movement of the movable track 18 relative to the fixed track 17. Thus, the seat assembly 11 is movable between the plurality of fore/aft seating positions.

Referring to FIGS. 9 and 10, when the memory plate 92 is in the memory position, the memory tab 110 is withdrawn from the recess 103 on the guide bracket 96 and the memory teeth 112 are engaged with the angled teeth 95 of the tooth rack 94 to identify the previously selected fore/aft seating position of the seat assembly 11. With the memory plate 92 in the memory position, the guide bracket 96 and the movable track 18 slide relative to the memory plate 92. In other words, when the memory plate 92 is in the memory position, the memory plate 92 is matingly coupled with the angled teeth 95 of the tooth rack 94 and therefore does not travel with the movable track 18 during sliding movement of the movable track 18 relative to the fixed track 17. Thus, the seat assembly 11 is movable between the previously selected fore/aft seating position and the easy-entry position. Further, as shown in FIG. 10, when the memory plate 92 is in the memory position, the memory tab 110 is trapped in the guide slot 98 during sliding movement of the movable track 18 as the seat assembly 11 moves between the previously selected fore/aft seating position and the easy-entry position. Thus, the memory plate 92 remains in the memory position until the memory tab 110 returns to the recess 103 on the guide bracket 96.

Figure 11:
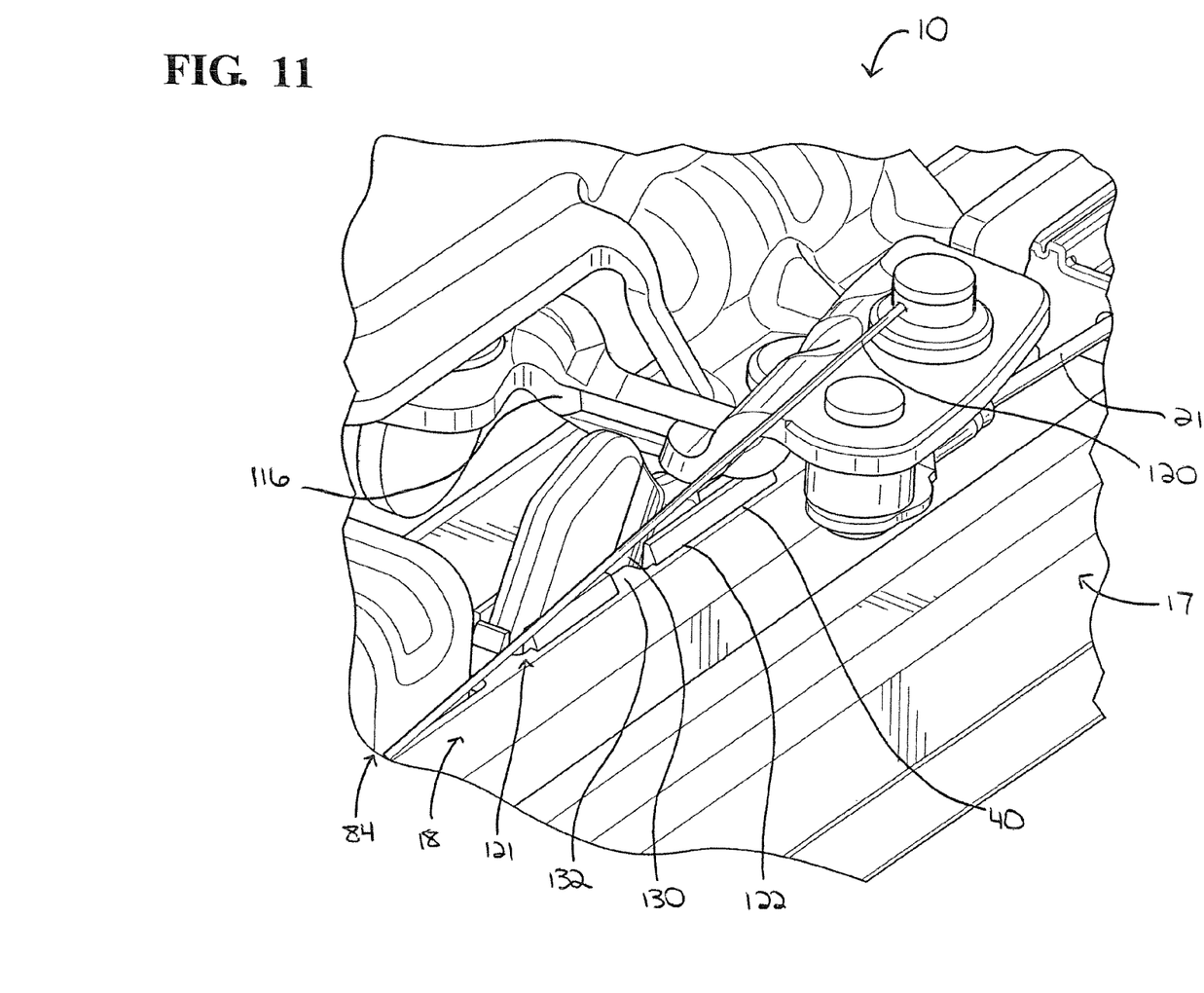
FIG. 11 is a fragmentary perspective view of the seat track assembly of FIG. 1 showing a cam lever and slider.

The memory plate 92 rotates from the home position to the memory position in response to pivoting the seat back 13 from one of the reclined seating positions to the forwardly folded position. More specifically, a cam lever 116 is pivotally coupled to the mounting bracket 82 at pivot 118, which defines a vertically extending axis 119, as shown in FIGS. 2 and 3. A Bowden-type cable 120, as shown in FIG. 11, is operatively coupled between the seat back 13 and the cam lever 116 such that pivoting the seat back 13 to the forwardly folded position causes the cam lever 116 to rotate in a first direction about pivot 118. As the cam lever 116 rotates in the first direction, the cam lever 116 pushes a slider 121 downward and rearward from a raised position, as shown in FIG. 5, to a depressed position, as shown in FIG. 9. The slider 121 extends through an opening 122 in the upper portion 40 of the movable track 18 and is adapted to contact the memory plate 92 and the arm 88 of the latch release lever 84. When the memory plate 92 is in the home position, the rear end 106 of the memory plate 92 is in contact with an underside of the slider 121 and maintains the slider 121 in the raised position, as shown in FIG. 5. As the cam lever 116 pushes the slider 121 from the raised position to the depressed position, the slider 121 pushes against the rear end 106 of the memory plate 92 and rotates the memory plate 92 from the home position to the memory position, as shown in FIG. 9.

The movement of the slider 121 from the raised position to the depressed position also actuates the latch body 72 from the locked position to the unlocked position. A built-in delay function ensures the memory teeth 112 on the memory plate 92 are engaged with the angled teeth 95 of the tooth rack 94 prior to the latch body 72 being actuated to the unlocked position. More specifically, a rearward end 123 of the slider 121 includes a ramped edge 124 facing downward and the arm 88 of the latch release lever 84 includes a ramped edge 125 facing upward, wherein the opposing ramped edges 124, 125 come into contact as the slider 121 moves from the raised position to the depressed position, as shown in FIG. 9. The ramped edges 124, 125 are configured such that the slider 121 rotates the memory plate 92 to engage the memory teeth 112 with the angled teeth 95 of the tooth rack 94 before rotating the latch release lever 84 to actuate the latch body 72 to the unlocked position. Further, as the ramped edge 124 at the rearward end 123 of the slider 121 comes into contact with the ramped edge 125 of the latch release lever 84, a forward end 126 of the slider 121 comes into contact with the latch body 72 to prevent the slider 121 from further rotating the memory plate 92.

At least one side of the slider 121 includes a groove 130 extending downwardly and rearwardly at an angle that corresponds with the downward and rearward movement of the slider 121. The groove 130 is aligned with a guide tab 132 formed along an edge of the opening 122 in the upper portion 40 of the movable track 18, as shown in FIG. 11. As the cam lever 116 pushes the slider 121 downward and rearward, the guide tab 132 cooperates with the groove 130 to guide the slider 121 from the raised position to the depressed position.

Referring to FIG. 9, the rearward end 123 of the slider 121 may include a recess or step 134 facing upward that is adapted to maintain the slider 121 in the depressed position while the seat assembly 11 moves between the previously selected fore/aft seating position and the easy-entry position. More specifically, when the slider 121 is in the depressed position, the step 134 is disposed underneath the upper portion 40 of the movable track 18. The step 134 therefore prevents the slider 121 from moving upward while the seat assembly 11 moves between the previously selected fore/aft seating position and the easy-entry position. For example, if the seat back 13 is pivoted to an upright position before the seat assembly 11 is returned to the previously selected fore/aft seating position, the cam lever 116 will rotate in a second direction about pivot 118 and the bias of the leaf spring 78 will tend to urge the latch body 72, the arm 88 of the latch release lever 84, and the slider 121 upward. This would generally result in the latch body 72 returning to the locked position before the seat assembly 11 is returned to the previously selected fore/aft seating position. However, with the step 134 disposed underneath the upper portion 40 of the movable track 18, the slider 121 is prevented from moving upward and remains in the depressed position, which in turn maintains the latch body 72 in the unlocked position. In other words, the step 134 acts as a hold-open feature for the latch mechanism 70. Alternatively, rather than a step on the slider, an interlock assembly may be used to prevent the seat back from pivoting to the upright position before the seat assembly is returned to the previously selected fore/aft seating position, as is described in U.S. Pat. No. 9,308,834, the disclosure of which is hereby incorporated by reference in its entirety.

Referring to FIG. 5, the step 134 is moved from underneath the upper portion 40 of the movable track 18 in response to contact of the slider 121 with the engagement surface 115 on the memory plate 92 as the seat assembly 11 is returned from the easy-entry position to the previously selected fore/aft seating position. More specifically, as the seat assembly 11 is returned rearward to the previously selected fore/aft seating position, the slider 121 contacts the engagement surface 115 on the memory plate 92. Since the memory plate 92 is in the memory position coupled with the angled teeth 95 of the tooth rack 94, the memory plate 92 is prevented from moving, and contact between the slider 121 and the memory plate 92 moves the slider forward such that the step 134 is withdrawn from underneath the upper portion 40 of the movable track 18 and the slider 121 is then free to return to the raised position.

In operation, beginning with the memory plate 92 in the home position, as shown in FIG. 5, such that the memory teeth 112 on the memory plate 92 are disengaged from the angled teeth 95 of the tooth rack 94, the primary seat track assembly 15 is freely adjustable to move the seat assembly 11 between the plurality of fore/aft seating positions by lifting the towel bar 80. When the towel bar 80 is lifted, the extension bracket 87 and the latch release lever 84 rotate about pivot 86 and the arm 88 of latch release lever 84 pushes the latch body 72 downward from the locked position to the unlocked position. With the latch body 72 in the unlocked position, the loop latch 74 is disengaged from the latching teeth 76 on the fixed track 17 and the movable track 18 is free to slide relative to the fixed track 17. The memory plate 92 is in the home position, wherein the head portion 117 of the memory tab 110 is secured within the front and rear walls 105, 107 of the recess 103 on the guide bracket 96, and the arm portion 128 of the memory tab 110 is engaged with the truncated corner 113, as shown in FIG. 8. As the movable track 18 slides relative to the fixed track 17, the memory plate 92 travels therewith. Once the particular fore/aft seating position is selected, the towel bar 80 is released and the leaf spring 78 returns the latch body 72 to the locked position. With the latch body 72 in the locked position, the loop latch 74 is engaged with the latching teeth 76 on the fixed track 17, as shown in FIG. 2, thereby locking the movable track 18 relative to the fixed track 17.

For ingress and egress or additional storage area behind the seat assembly 11, the seat back 13 is actuated to the forwardly folded position. As the seat back 13 pivots forward to the forwardly folded position, the Bowden-type cable 120 is pulled and causes the cam lever 116 to rotate in the first direction about pivot 118. As the cam lever 116 rotates in the first direction, the cam lever 116 pushes the slider 121 downward and rearward and the guide tab 132 on the movable track 18 cooperates with the groove 130 on the slider 121 to guide the slider 121 from the raised position to the depressed position, as shown in FIG. 9. Movement of the slider 121 from the raised position to the depressed position rotates the memory plate 92 about pivot 108 from the home position to the memory position such that the head portion 117 of the memory tab 110 is no longer secured within the front and rear walls 105, 107 of the recess 103 on the guide bracket 96, and the arm portion 128 of the memory tab 110 is no longer engaged with the truncated corner 113, as shown in FIG. 10. The memory teeth 112 on the memory plate 92 are engaged with the angled teeth 95 of the tooth rack 94 to identify the previously selected fore/aft seating position, as shown in FIG. 9. As the memory teeth 112 on the memory plate 92 engage the angled teeth 95 of the tooth rack 94, the ramped edge 124 on the slider 121 comes into contact with the ramped edge 125 on the arm 88 of latch release lever 84 to rotate the latch release lever 84 about pivot 86 and actuate the latch body 72 from the locked position to the unlocked position. With the memory plate 92 in the memory position and the latch body 72 in the unlocked position, the movable track 18 is slid forward relative to the fixed track 17 to move the seat assembly 11 from the previously selected fore/aft seating position to the easy-entry position.

To return the seat assembly 11 to the previously selected fore/aft seating position, the movable track 18 is slid rearward relative to the fixed track 17 until the slider 121 contacts the engagement surface 115 on the memory plate 92, which causes the slider 121 to move forward, thereby withdrawing the step 134 from underneath the upper portion 40 of the movable track 18. The forward end 100 of the guide slot 98 then contacts the head portion 117 of the memory tab 110, which stops the seat assembly 11 at the previously selected fore/aft seating position. After the seat assembly 11 is stopped at the previously selected fore/aft seating position, continued rearward force applied to the seat back 13 pivots the seat back 13 to the upright position. As the seat back 13 pivots to the upright position, the cam lever 116 rotates in the second direction about pivot 118 and the bias of the leaf spring 78 moves the latch body 72 upward into the locked position, as shown in FIG. 2. As the latch body 72 moves upward, the arm 88 of the latch release lever 84 moves the slider 121 upward into the raised position. At the same time, the coil spring 114 pushes the front end 104 of the memory plate 92 downward, which rotates the memory plate 92 about pin 108 until the memory tab 110 is again disposed in the recess 103 on the guide bracket 96. The memory plate 92 is now in the home position and the movable track 18 is locked relative to the fixed track 17.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

The invention claimed is:

1. A seat track assembly for providing forward and rearward movement of a seat assembly along a floor of an automotive vehicle, the seat track assembly comprising:
 a fixed track adapted to be fixedly secured to the floor of the automotive vehicle;
 a tooth rack extending along and fixedly secured to the fixed track, the tooth rack having a plurality of teeth extending upwardly therefrom;
 a movable track adapted to be fixedly secured to the seat assembly and slidably coupled to the fixed track, the movable track including an elongated slot extending between opposite first and second ends and having a recess at the first end thereof, wherein the recess is defined by a front wall extending from the first end of the elongated slot, an opposite rear wall, a floor extending between the rear and front walls, and a truncated corner connecting the rear wall of the recess to the elongated slot;
 a latch mechanism operatively coupled between the fixed and movable tracks, wherein the latch mechanism prevents sliding movement of the movable track and is selectively disengaged from the fixed track to allow sliding movement of the movable track between a plurality of positions; and
 a memory mechanism operatively coupled to the moveable track and operable between:
  a home position in which the memory mechanism is disengaged from the plurality of teeth for moving with the moveable track during sliding movement thereof, and a memory position in which the memory mechanism is engaged with the plurality of teeth for coupling to the fixed track to define a previously selected one of the plurality of positions, wherein the memory mechanism includes a memory plate extending between a first end and an opposite second end, and wherein the memory plate includes a memory tab extending laterally therefrom to selectively engage the recess of the elongated slot;

wherein the memory tab extends along the elongated slot between a head portion and an arm portion such that the head portion is adapted to selectively and matingly couple within the front and rear walls of the recess and the arm portion is adapted to selectively engage the truncated corner for reducing friction between the recess and the memory tab as the memory mechanism moves to and from the home position;

wherein actuation of the memory mechanism to the memory position disengages the latch mechanism from the fixed track, thereby allowing sliding movement of the movable track in a first direction from the previously selected one of the plurality of positions to an easy-entry position, and in a second direction opposite the first direction from the easy-entry position wherein the memory mechanism stops the movable track at the previously selected one of the plurality of positions, thereby reengaging the latch mechanism with the fixed track and returning the memory mechanism to the home position, and wherein the plurality of teeth are angled from a vertical position for increasing engagement with the memory mechanism when in the memory position to further secure the memory mechanism to the fixed track at the previously selected one of the plurality of positions.

2. The seat track assembly of claim 1 wherein the plurality of teeth are angled rearward towards the second direction.

3. The seat track assembly of claim 2 wherein the latch mechanism is independently operable to disengage the latch mechanism from the fixed track when the memory mechanism is in the home position.

4. The seat track assembly of claim 3 wherein the memory plate is operatively coupled to the movable track such that the memory plate is disengaged from the plurality of teeth when the memory mechanism is in the home position and the memory plate is engaged with the plurality of teeth when the memory mechanism is in the memory position.

5. The seat track assembly of claim 4 wherein the memory plate is slidably coupled to the elongated slot such that the memory tab is disposed in the recess when the memory mechanism is in the home position and the memory tab is withdrawn from the recess when the memory mechanism is in the memory position.

6. The seat track assembly of claim 5 wherein the first end of the elongated slot contacts the memory tab to stop the movable track at the previously selected one of the plurality of positions in response to sliding movement of the movable track in the second direction.

7. The seat track assembly of claim 6 wherein the memory plate includes at least one memory tooth extending from the first end thereof for engaging the plurality of teeth of the tooth rack when the memory mechanism is in the memory position.

8. The seat track assembly of claim 7 wherein the memory mechanism is biased towards the home position.

9. The seat track assembly of claim 8 further comprising a latch release lever pivotally coupled to the movable track, wherein the latch release lever directly engages the latch mechanism and is operable to disengage the latch mechanism from the fixed track in response to pivotal movement of the latch release lever.

10. The seat track assembly of claim 9 further comprising a slider for engaging the second end of the memory plate and the latch release lever, wherein the slider is operable between a raised position when the memory mechanism is in the home position and the latch mechanism is engaged with the fixed track, and a depressed position when the memory mechanism is in the memory position and the latch mechanism is disengaged from the fixed track.

11. The seat track assembly of claim 10 further comprising a guide tab disposed on the movable track, the guide tab adapted and arranged for engaging and guiding and the slider between the raised position and the depressed position.

12. The seat track assembly of claim 11 wherein the movable track contacts the slider in the depressed position to prevent the slider from moving to the raised position during sliding movement of the movable track between the previously selected one of the plurality of positions and the easy-entry position, thereby preventing engagement of the latch mechanism with the fixed track.

13. The seat track assembly of claim 12 further comprising a cam lever pivotally coupled to the movable track for engaging the slider, wherein pivotal movement of the cam lever in a first direction moves the slider from the raised position to the depressed position.

14. The seat track assembly of claim 13 wherein movement of the slider from the raised position to the depressed position actuates the memory mechanism to the memory position prior to disengaging the latch mechanism from the fixed track.

15. The seat track assembly of claim 14 wherein movement of the slider from the depressed position to the raised position allows the latch mechanism to engage the fixed track prior to allowing the memory mechanism to return to the home position.

16. A seat track assembly providing forward and rearward movement of a seat assembly along a floor of an automotive vehicle, the seat track assembly comprising:

a fixed track adapted to be fixedly secured to the floor of the automotive vehicle;

a movable track adapted to be fixedly secured to the seat assembly and slidably coupled to the fixed track, the moveable track including an elongated slot extending between opposite first and second ends with a recess extending from the first end thereof;

a latch mechanism operatively coupled between the fixed and movable tracks, wherein the latch mechanism prevents sliding movement of the movable track and is selectively disengaged from the fixed track to allow sliding movement of the movable track between a plurality of positions; and a memory mechanism including a memory plate operatively coupled to the moveable track and a memory tab extending laterally from the memory plate through the elongated slot, wherein the memory mechanism is operable between a home position in which the memory plate is disengaged from the fixed track and the memory tab is secured in the recess of the elongated slot for moving with the moveable track during sliding movement thereof, and a memory position in which the memory plate is engaged with the fixed track and the memory tab is withdrawn from the recess of the elongated slot to define a previously selected one of the plurality of positions, wherein actuation of the memory mechanism to the memory position disengages the latch mechanism from the fixed track, thereby allowing sliding movement of the movable track in a first direction from the previously selected one of the plurality of positions to an easy-entry position, and in a second direction opposite the first direction from the easy-entry position wherein the memory tab reengages the recess to stop the movable track at the previously selected one of the plurality of positions, thereby reengaging the latch mechanism with the fixed track and returning the memory mechanism to the home position, wherein the recess is defined by a front wall extending from the first end of the elongated slot, an opposite rear wall, a floor extending between the front and rear walls, and a truncated corner connecting the front wall of the recess to the elongated slot, and wherein the memory tab extends along the elongated slot between a head portion and an arm portion such that the head portion is adapted to selectively and matingly couple within the front and rear walls of the recess, and the arm portion is adapted to selectively engage the truncated corner for reducing friction between the recess and the memory tab as the memory mechanism moves to and from the home position.

17. The seat track assembly of claim 16 wherein the latch mechanism is independently operable to disengage the latch mechanism from the fixed track when the memory mechanism is in the home position.

18. The seat track assembly of claim 17 further comprising a tooth rack extending along and fixedly secured to the fixed track, the tooth rack having a plurality of teeth extending upwardly therefrom, wherein the memory plate is disengaged from the plurality of teeth when the memory mechanism is in the home position, and the memory plate is engaged with the plurality of teeth when the memory mechanism is in the memory position.

19. The seat track assembly of claim 18 wherein the plurality of teeth are angled from a vertical position for increasing engagement with the memory plate when the memory mechanism in the memory position to further secure the memory plate to the fixed track at the previously selected one of the plurality of positions.

20. The seat track assembly of claim 19 wherein the plurality of teeth are angled rearward towards the second direction.

21. The seat track assembly of claim 20 wherein the memory plate extends between a first and an opposite second end and includes at least one memory tooth extending from the first end thereof, wherein the at least one memory tooth is engaged with the plurality of teeth of the tooth rack when the memory mechanism is in the memory position and disengaged with the plurality of teeth of the tooth rack when the memory mechanism is in the home position.

22. The seat track assembly of claim 21 wherein the memory mechanism is biased towards the home position.

23. The seat track assembly of claim 22 further comprising a latch release lever pivotally coupled to the movable track, wherein the latch release lever directly engages the latch mechanism and is operable to disengage the latch mechanism from the fixed track in response to pivotal movement of the latch release lever.

24. The seat track assembly of claim 23 further comprising a slider for engaging the second end of the memory plate and the latch release lever, wherein the slider is operable between a raised position when the memory mechanism is in the home position and the latch mechanism is engaged with the fixed track, and a depressed position when the memory mechanism is in the memory position and the latch mechanism is disengaged from the fixed track.

25. The seat track assembly of claim 24 further comprising a guide tab disposed on the movable track, the guide tab adapted and arranged for engaging and guiding and the slider between the raised position and the depressed position.

26. The seat track assembly of claim 25 wherein the movable track contacts the slider in the depressed position to prevent the slider from moving to the raised position during sliding movement of the movable track between the previously selected one of the plurality of positions and the easy-entry position, thereby preventing engagement of the latch mechanism with the fixed track.

27. The seat track assembly of claim 26 further comprising a cam lever pivotally coupled to the movable track for engaging the slider, wherein pivotal movement of the cam lever in a first direction moves the slider from the raised position to the depressed position.

28. The seat track assembly of claim 27 wherein movement of the slider from the raised position to the depressed position actuates the memory mechanism to the memory position prior to disengaging the latch mechanism from the fixed track.

29. The seat track assembly of claim 28 wherein movement of the slider from the depressed position to the raised position allows the latch mechanism to engage the fixed track prior to allowing the memory mechanism to return to the home position.

* * * * *